United States Patent [19]
Rial

[11] Patent Number: 5,582,095
[45] Date of Patent: Dec. 10, 1996

[54] FOOD-WARMING ARRANGEMENT FOR A FOOD-DELIVERING MOTOR VEHICLE

[76] Inventor: Jose A. Rial, Av. Maipú 1701 1638, 1638 - Vicente Lopez, Argentina

[21] Appl. No.: 578,108

[22] Filed: Dec. 26, 1995

[51] Int. Cl.⁶ ............................ A23L 3/00; B65G 17/12; B65G 47/34; E04H 3/02
[52] U.S. Cl. ............... 99/483; 99/357; 99/467; 99/470; 126/19.5; 296/22; 296/24.1
[58] Field of Search ............... 99/483, 422, 432, 99/427, 467, 470, 476, 340; 126/19.5, 21 A, 261; 237/12.3 B, 12.3 C; 186/41, 50; 296/22, 24.1; 426/523

[56] References Cited

U.S. PATENT DOCUMENTS

| | | |
|---|---|---|
| 1,559,909 | 11/1925 | Paul . |
| 1,757,448 | 5/1930 | Cooper . |
| 1,861,672 | 7/1932 | Whisner . |
| 2,168,491 | 8/1939 | Parmeter . |
| 2,756,031 | 7/1956 | Sanstrom . |
| 2,970,589 | 2/1961 | Cushman . |
| 3,288,129 | 11/1966 | Fox . |
| 3,590,802 | 7/1971 | Fried . |
| 3,809,361 | 5/1974 | Burk et al. ............... 126/19.5 |
| 3,874,361 | 4/1975 | Parrinello ............... 126/19.5 |
| 4,162,670 | 7/1979 | Hays ............... 126/19.5 |
| 4,912,338 | 3/1990 | Bingham ............... 296/22 X |
| 4,919,477 | 4/1990 | Bingham et al. ............... 296/24.1 |
| 5,109,956 | 5/1992 | Casale et al. ............... 186/41 |
| 5,233,969 | 8/1993 | Koledin . |
| 5,279,392 | 1/1994 | Casale et al. ............... 186/41 |
| 5,287,948 | 2/1994 | Casale et al. ............... 186/50 X |
| 5,404,808 | 4/1995 | Smith et al. ............... 99/483 |
| 5,505,122 | 4/1996 | Gerrit ............... 99/483 X |

*Primary Examiner*—Timothy F. Simone
*Attorney, Agent, or Firm*—Dvorak and Traub

[57] ABSTRACT

A food warming arrangement for keeping food at a desired temperature in a food-delivering motor cycle, by taking profit of the heat contained in the exhaust gases of the motor cycle engine, the engine comprising an exhaust gas outlet, the arrangement comprising at least one food-containing case made of thermal insulating walls for defining a warming inner chamber; a heat exchanger within the case, the heat exchanger having a gas inlet and a gas outlet; a pipe having a distal end connected to the engine exhaust gas outlet and a proximal end comprising a flexible portion connected to the gas inlet of the heat exchanger, a thermal insulating material covering the entire pipe and a muffler connected to the heat exchanger gas outlet.

13 Claims, 2 Drawing Sheets

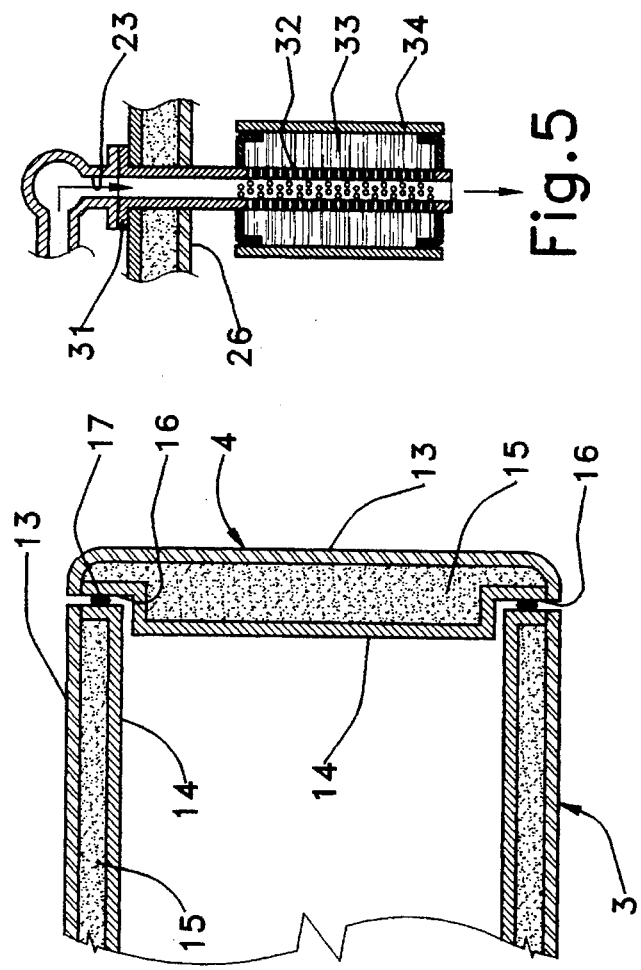
Fig. 3
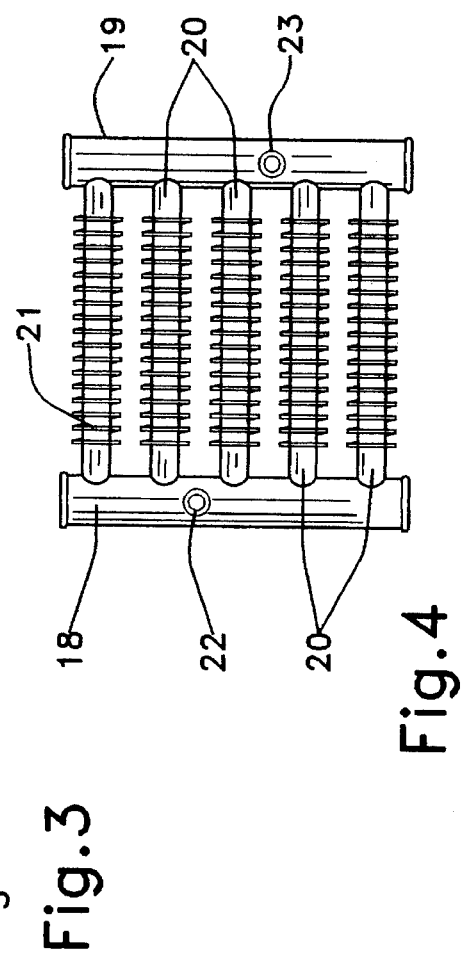
Fig. 5
Fig. 4
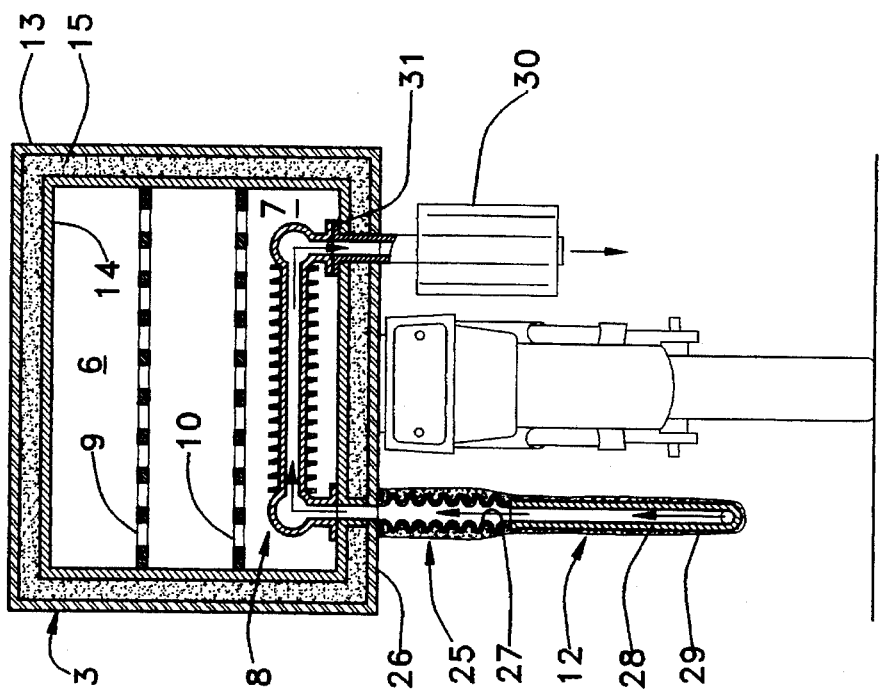
Fig. 2

FOOD-WARMING ARRANGEMENT FOR A FOOD-DELIVERING MOTOR VEHICLE

BACKGROUND OF THE INVENTION

1. Field of the Invention

The present invention relates to the field of maintaining foodstuffs and meals in a heated condition during delivery from a food store, so that the food is delivered to the consumer in warm and good conditions for consuming purposes, and particularly the invention refers to a food-warming arrangement for carrying the food in a delivering motor vehicle, without the provision of an extra heat source but taking profit of the heat contained in the exhaust gas of an engine of the vehicle.

2. Description of the Prior Art

It is well known that an internal combustion engine generates high temperatures as a result of the fuel burned within the combustion chamber of the engine. Part of the heat is converted in power for moving the vehicle and the remaining heat must be removed. Part of this heat is removed by circulating a coolant through a cooling circuit of the engine while a remaining part is lost in the exhaust gases through the exhaust pipe or outlet of the engine. This heat is energy that is lost without any saving being made thereof.

Few attempts have been done to save such a lost heat energy, for example by taking profit thereof in a heater for heating the car cockpit. Another application for saving the heat energy has been the fact of preheating the fuel at the inlet of the carburetor by taking heat either from the coolant in the cooling circuit of the engine or from the exhaust combustion gas.

There are other systems that save the heat of the engine cooling system for heating goods carried in a motor vehicle. These systems are disclosed in the U.S. Pat. Nos. 1,907,032; 3,809,059; 3,288,129; 4,162,670; 3,874,361 and WO 92/16137.

There is the need, however, of having a warming system for maintaining foodstuffs warm in a food delivering vehicle, particularly in such motor vehicles which are provided with combustion engines that do not have a liquid coolant circulating in a cooling circuit. In such a vehicles, like most of the motor cycles and, particularly, the little motor cycles widely used for delivering meals and food, such as pizza, the heat generated by the engine is lost through the exhaust pipe in the exhaust gas. No taking profit of this gas is known for warming food in these delivering vehicles.

All the known food delivering motor cycles use a food-carrying box made of insulating material with the purpose of keeping the cooked meals as warm as possible. Since the motor cycle generally has to deliver the meals to more than one home's client, and the door of the box must be opened more than once, the heat of the meals is continuously lost. Therefore, the clients receive the meals cool and must warm them up before consuming.

SUMMARY OF THE INVENTION

It is therefore an object of the invention to provide the means for saving the heat generated by the engine of motor vehicle, particularly the heat contained in the exhaust gas of the engine, and taking profit of this heat in a food-warming arrangement for maintaining food at a desired temperature, for eating purposes, in an insulated box of a food-delivering motor vehicle such as a car, truck, wagon or motor cycle.

It is another object of the invention to provide a food warming arrangement for keeping food at a desired temperature in a food-delivering motor vehicle, by taking profit of the heat contained in the exhaust gases of the vehicle engine, the engine comprising an exhaust gas outlet, the arrangement comprising: at least one food-containing case made of thermal insulating walls for defining a warming inner chamber; heat exchanging means within the case, the heat exchanging means having a gas inlet and a gas outlet; tubing means having a distal end connected to the engine exhaust gas outlet and a proximal end comprising a flexible portion connected to the gas inlet of the heat exchanging means, the connection between the flexible portion and the gas inlet of the heat exchanging means being provided through one of the case walls; a thermal insulating material covering the entire tubing means; and muffler means connected to the heat exchanging means gas outlet through a wall of the case.

The above and other objects, features and advantages of this invention will be better understood when taken in connection with the accompanying drawings and description.

BRIEF DESCRIPTION OF THE DRAWINGS

The present invention is illustrated by way of example in the following drawings wherein:

FIG. 2 is a cross-section view taken along line II—II of FIG. 1;

FIG. 3 is a cross-section view of part of the food containing box, taken along line III—III of FIG. 1;

FIG. 4 is a bottom view of a preferred embodiment of the heat exchanging means; and FIG. 5 is a cross section of a preferred muffler.

DESCRIPTION OF THE PREFERRED EMBODIMENTS

Figure 1:
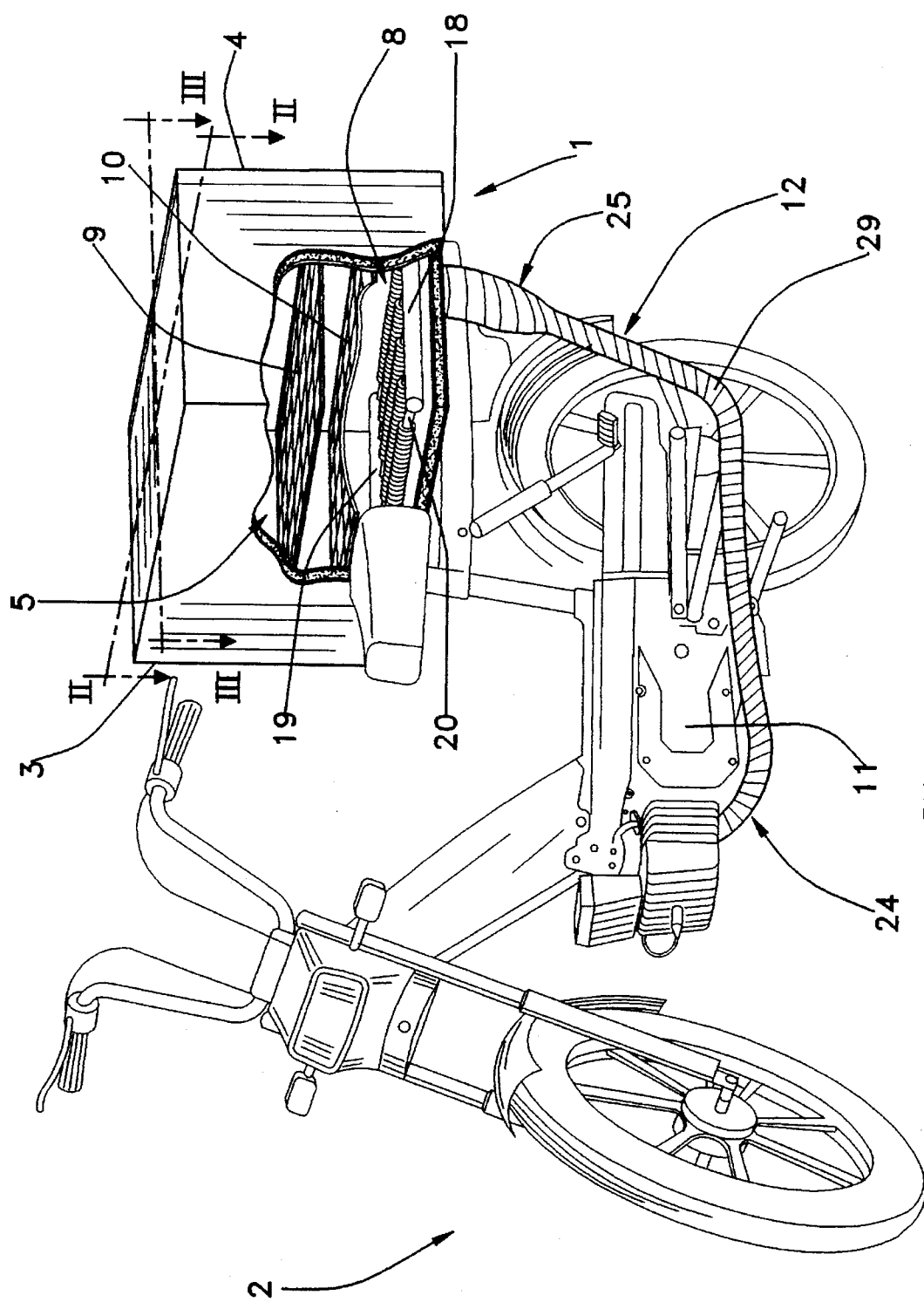
FIG. 1 is a perspective view of a motor cycle including the food-warming arrangement of the invention, with parts of the arrangement partially removed for clarity purposes.

Referring now in detail to the drawings, it may be seen from FIG. 1 a food-warming arrangement 1 according to the invention, mounted in a rear part of a motor cycle 2. The terms "food-warming arrangement " or "food-heating arrangement" should be understood as an arrangement for keeping food or meals at a desired temperature, preferably at the temperature to be eaten, depending this temperature from the kind of food or meal.

Device 1 comprises a food containing box 3 made, as will be then explained, of thermal insulating walls, and defining an inner warming chamber 5, the box or case 3 having a rear door 4 capable of closing the box to keep the chamber duly insulated. Chamber 5 has an upper portion 6 for accommodating the meals in trays 9 and a lower portion 7 housing heat exchanging means, separated from the upper portion by a foraminous plate 10. Heat exchanging means 8 are capable of providing enough heat to inner chamber 6, 7 by taking profit of the heat contained in the exhaust gas from engine 11, the gas circulating through a tubing or pipe 12.

Box 3 comprises an outer layer 13 preferably made of a plastic material, such as PVC, and an inner layer 14 made of an aluminum plate having a thickness of 2 to 3 mm. An intermediate layer 15 of insulating plastic foam, such as polyurethane foam, is injected between layers 13 and 14. Layer 15 may also comprise a glass fiber cloth. Box 3 may preferably have the following dimensions, height 400 mm, width 450 mm and length 350 mm. As it is shown in FIG. 3, the structure of door 4 is like the one of the walls of the box, the door having a recess 16 for improving the coupling with the box walls and a weather seal 17 for improving the insulating features of the food containing box. The cross-section view of FIG. 3 does not shown heat exchanging means 8 for clarity purposes.

Heat exchanging means 8 comprises a grill-like exchanger which is more completely shown in FIG. 4. Exchanger 8 comprises two opposed header tubes, an inlet header tube 18 and an outlet header tube 19. A plurality of parallel tubes 20 are extended between the header tubes 18, 19 and are connected thereto. For improving the heat transmission from the gas circulating through the exchanger, tubes 20 include a plurality of heat radiating leaves 21, transversely located relative to the tubes. The leaves in each tube are formed by a copper strip helically welded to most of the length of the associated tube, comprising preferably 320 leaves per meter. Leaves 21 may of course comprise a plurality of parallel separated leaves. Leaves 21 may also comprise elongated leaves longitudinally arranged along the associated tube. Each header tube 18, 19 has a corresponding gas inlet orifice 22 and a gas outlet orifice 23 located in around a mid length portion of the associated tube, preferably offset of any connection between the header tube 18, 19 and tubes 20.

Tubing or pipe 12 has a distal end 24 connected to engine 11 and a proximal end 25 connected to orifice 22, through a bottom wall 26 of the box. Pipe 12 comprises a metal tube 28 insulated by a wrapping 29 made of at least one layer of glass fiber cloth. To avoid failure of the connection between pipe 12 and header tube 18, proximal end 25 comprises a flexible portion, preferably consisting of a corrugated tube 27, of approximately 10 cm, welded to metal tube 28. Metal tubes 27 and 28 are preferably made of copper.

Orifice 23 is connected to a muffler 30 which may include a flange 31 fixed, by welding for example, directly to gas outlet 23 as it is illustrated in more detail in FIG. 5, where can also be seen that the muffler comprises a tube having a multi-perforated tube portion 32, connected to the gas outlet orifice 23, a layer of glass fiber material 33 wrapped around the multi-perforated tube and a cylindrical outer case 34 arranged around layer 33, so that the layer is compressed between multi-perforated tube 32 and cylindrical case 34. Tube 32 has a lenght of approximately 14,5 cm and an inner diameter having approximately 1,1 cm.

The exhaust gas exiting from engine 11 circulates along pipe 12 and enters header tube 18 through orifice 22, then uniformly passes through all tubes 20 so as leaves 21 transfer by radiation most of the heat contained in the gas to inner chamber 6,7. The cooled gas exits then through orifice 23 to header tube 19 and enters the multi-perforated tube 32 which defines a muffler path for the gas exiting from the exchanger. According to tests carried out in a food-warming arrangement of the invention installed in a motor cycle, at a room temperature of 12° C., the motor cycle circulating during 30 minutes and delivering meals, a temperature measured within the inner chamber 6 was 90° C., more than enough to keep the meals at consuming conditions. The temperature measured at the exit of orifice 23 was practically the same that the room temperature, therefore it may be concluded that all heat of the exhaust gas is transferred to chamber 6,7.

While preferred embodiments of the present invention have been illustrated and described, it will be obvious to those skilled in the art that various changes and modifications may be made therein without departing from the scope of the invention as defined in the appended claims.

I claim:

1. A food-warming arrangement for keeping food at a desired temperature in a food-delivering motor vehicle, by taking profit of the heat contained in the exhaust gases of the vehicle engine, the engine comprising an exhaust gas outlet, the arrangement comprising:

at least one food-containing case made of thermal insulating walls for defining a warming inner chamber;

heat exchanging means within the case, the heat exchanging means having a gas inlet and a gas outlet;

tubing means outside the case and having a distal end connected to the engine exhaust gas outlet and a proximal end comprising a flexible portion connected to the gas inlet of the heat exchanging means, the connection between the flexible portion and the gas inlet of the heat exchanging means being provided through one of the case walls;

a thermal insulating material covering the entire tubing means; and muffler means outside the case and connected to the heat exchanging means gas outlet, through a wall of the case.

2. The food-warming arrangement of claim 1, wherein the vehicle is a motor cycle and the case is a box supported at a rear part of the motor cycle.

3. The food-warming arrangement of claim 1, wherein the heat exchanging means comprising a tubular exchanger made of copper.

4. The food-warming arrangement of claim 1, wherein the heat exchanging means comprising a plurality of parallel tubes having respective inlet and outlet open ends, the inlet ends being connected to an inlet header tube and the outlet ends being connected to an outlet header tube, the tubes and header tubes being made of copper, the inlet and the outlet header tubes having respective orifices defining the gas inlet and the gas outlet of the heat exchanging means.

5. The food-warming arrangement of claim 4, wherein each orifice being located in a midlength portion of the respective header tube.

6. The food-warming arrangement of claim 4, wherein each of the parallel tubes having a plurality of heat radiating leaves, the leaves extending transversely to the associated tube and being formed by a copper strip helically extended and welded along the associated tube.

7. The food-warming arrangement of claim 6, wherein each of the parallel tubes having a density of 320 leaves per meter.

8. The food-warming arrangement of claim 1, wherein the thermal insulating material covering the entire tubing means comprising a wrapping made of at least one a layer of glass fiber cloth.

9. The food-warming arrangement of claim 1, wherein the walls of the food-containing case include a plastic thermal insulating foam.

10. The food-warming arrangement of claim 1, wherein the food-containing case includes at least one door having weather seals to keep the warming inner chamber thermally insulated when the door is closed.

11. The food-warming arrangement of claim 1, wherein the warming inner chamber defines an upper portion and a lower portion, the heating exchanging means being located in the lower portion of the chamber, the upper and the lower portions being separated by a foraminous plate.

12. The food-warming arrangement of claim 11, wherein the warming inner chamber includes supporting means for supporting food trays in the upper portion of the chamber.

13. The food-warming arrangement of claim 1, wherein the muffler means comprises a multi-perforated tube connected to the gas outlet of the heat exchanging means, a layer of glass fiber material wrapped around the multi-perforated tube and a cylindrical outer case arranged around the layer, so that the layer is compressed between the multi-perforated tube and the cylindrical case, the multi-perforated tube defining a path for the gas exiting from the heat exchanging means.

* * * * *